(12) United States Patent
Zhu et al.

(10) Patent No.: US 10,202,662 B2
(45) Date of Patent: Feb. 12, 2019

(54) SYSTEM AND METHOD FOR FLUIDIZED REDUCTION OF IRON ORE POWDER (71) Applicants: INSTITUTE OF PROCESS ENGINEERING, CHINESE ACADEMY OF SCIENCE, Beijing (CN); BEIJING ZHONGKAIHONGDE TECHNOLOGY CO., LTD., Beijing (CN)

(72) Inventors: Qingshan Zhu, Beijing (CN); Chuanlin Fan, Beijing (CN); Hongzhong Li, Beijing (CN); Zhaohui Xie, Beijing (CN); Wenheng Mu, Beijing (CN); Cunhu Wang, Beijing (CN); Xingang Jiao, Beijing (CN)

(73) Assignees: INSTITUTE OF PROCESS ENGINEERING, CHINESE ACADEMY OF SCIENCES, Beijing (CN); BEIJING ZHONGKAIHONGDE TECHNOLOGY CO., LTD., Beijing (CN)

(*) Notice: Subject to any disclaimer, the term of this patent is extended or adjusted under 35 U.S.C. 154(b) by 412 days.

(21) Appl. No.: 15/109,399

(22) PCT Filed: Dec. 30, 2014

(86) PCT No.: PCT/CN2014/095709
§ 371 (c)(1),
(2) Date: Aug. 25, 2016

(87) PCT Pub. No.: WO2015/101305
PCT Pub. Date: Jul. 9, 2015

(65) Prior Publication Data
US 2016/0369360 A1    Dec. 22, 2016

(30) Foreign Application Priority Data

Dec. 31, 2013  (CN) .......................... 2013 1 0751238

(51) Int. Cl.
*C21B 13/14* (2006.01)
*C21B 13/00* (2006.01)
(Continued)

(52) U.S. Cl.
CPC ........ *C21B 13/0033* (2013.01); *F27B 15/003* (2013.01); *F27B 15/10* (2013.01);
(Continued)

(58) Field of Classification Search
None
See application file for complete search history.

(56) References Cited

U.S. PATENT DOCUMENTS 5,082,251 A * 1/1992 Whipp ................ C21B 13/0033
266/142
2009/0308204 A1* 12/2009 Kooij .................. C21B 13/0033
75/449

(Continued)

FOREIGN PATENT DOCUMENTS

| CN | 101153349 A | 4/2008 |
| CN | 102443668 A | 5/2012 |

(Continued)

OTHER PUBLICATIONS

Translation of CN 101153349-A (published Apr. 2, 2008) from Espacenet.*

(Continued)

*Primary Examiner* — George Wyszomierski
(74) *Attorney, Agent, or Firm* — Gokalp Bayramoglu (57) ABSTRACT

A system and method for fluidized reduction of iron ore powder. Use of oxidation increases the iron ore reduction (Continued)

rate. Use of high-gas-velocity processing accelerates iron ore reduction speed and greatly improves the gas-treatment capabilities of a unit-cross-sectional fluidized bed. Use of parallel-connections involving reduced coal gas lessens the volume of gas passing through a single-stage fluidized bed. The invention achieves the highly-effective reduction of iron ore powder in a fluidized bed under near-atmospheric pressure.

8 Claims, 1 Drawing Sheet

(51) Int. Cl.
  *F27B 15/00* (2006.01)
  *F27B 15/10* (2006.01)
  *F27B 15/12* (2006.01)
(52) U.S. Cl.
  CPC .......... *F27B 15/12* (2013.01); *C21B 2100/66* (2017.05); *Y02P 10/136* (2015.11); *Y02P 10/216* (2015.11)

(56) References Cited

U.S. PATENT DOCUMENTS

2016/0348197 A1* 12/2016 Zhu .................. C21B 13/146
2016/0348199 A1* 12/2016 Millner ................ F27B 15/16

FOREIGN PATENT DOCUMENTS

| CN | 103667571 A | 3/2014 |
| CN | 103695588 A | 4/2014 |
| CN | 103725819 A | 4/2014 |
| WO | WO-9830497 A1 | 7/1998 |

OTHER PUBLICATIONS

International Search Report for International Application No. PCT/CN2014/095709, dated Apr. 9, 2015.

* cited by examiner

SYSTEM AND METHOD FOR FLUIDIZED REDUCTION OF IRON ORE POWDER

CROSS-REFERENCE TO RELATED APPLICATIONS

The present application is the US National Phase of International Patent Application No. PCT/CN2014/095709, filed Dec. 30, 2014, which claims priority to Chinese Application No. 2013107512383, filed Dec. 31, 2013, each of which is incorporated by reference in its entirety.

FIELD OF THE INVENTION

The present invention belongs to the fields of chemical engineering and metallurgy, and particularly relates to a system and method for fluidized iron ore powder reduction.

BACKGROUND OF THE INVENTION

The current pig-iron smelting mainly employs the blast furnace technology, which requires uses of coke and pellet, involving a relatively long workflow. Non-blast furnace ironmaking technologies have been paid more and more attention for lessening the dependence on coke. Non-blast ironmaking technologies can be divided into two types: direct reduction and melting reduction. The product from direct reduction is sponge iron obtained from the reduction of iron ore concentrate and mainly used as raw material for electric furnace steelmaking. In melting reduction, the sponge iron is further melted so as to obtain liquid iron after separation of slag-iron. Both direct reduction and melting reduction need to undergo a gas-solid phase reduction process of the iron ore concentrate. Their difference mainly lies in the metallization ratio. Direct reduction typically requires a metallization ratio of more than 90%, whereas the metallization ratio for the gas-solid phase reduction (commonly known as pre-reduction) in melting reduction can be as low as 75% due to the presence of subsequent final reduction in a molten bath. The pre-reduction of both direct reduction and melting reduction involves basically the same processes, during which solid iron ore is reduced in a gas phase. Therefore, they are collectively referred to as iron ore reduction in the present application. There are many methods for reducing iron ore, which can be divided into different categories, such as rotary kiln, rotary furnace, shaft furnace, fluidized bed, etc., according to the types of reduction reactors. The fluidized bed reduction reactor is recognized as the most efficient iron ore reduction reactor due to its prominent advantages including direct processing of powdered ore, good heat and mass transfer, high reduction efficiency, etc. compared to other reactors. Reduction of iron ore on a fluidized bed has been investigated for several decades, and a large number of process patent applications have been filed and some technologies such as FIOR/FINMET, FINEX, HISmelt, Circofer, and Circored have undergone pilot scale tests or been industrialized.

The FIOR process was first studied by the ESSO Research and Engineering Company in the 1950s. A 5 t/d laboratory-scale trial was completed in ESSO's laboratory (Baton Rouge, La., USA) in 1962, and a 300t/d factory was established in Canada (Darmouth, Nova Scotia) in 1965. In 1976, an industrial plant for producing hot briquettes with an annual output of 400,000 tons (U.S. Pat. No. 5,082,251 and U.S. Pat. No. 5,192,486) was established in Venezuela, and named as FIOR from the initials of "Fine Iron Ore Reduction". The plant has been putting into operation continuously till today. Having been developing the FINMET technology in cooperation with Voestalpine since 1992, the FIOR Company completed the validation for the FINMET technology in 1995. A FINMET system with an annual output of 500,000 tons began to be established in January 1998, was debugged in November 1999, and was put into operation formally in May 2000. Since 2001, two FINMET systems each having an annual output of 500,000 tons have been merged into a system with an annual output of 1 million tons. $H_2$+CO obtained from natural gas reforming is used as the reducing and fluidizing medium in FIOR/FINMET, in which four stages of fluidized beds are operated in series. The reducing gas with a gas pressure of 11-13 atm (gage pressure) passes through the fourth fluidized bed, the third fluidized bed, the second fluidized bed and the first fluidized bed in series. The unconsumed $H_2$ and CO in reduction exhaust gas are recycled after a purification process such as dust removal, decarbonization, etc. The iron ore powder is reduced on the first fluidized bed, the second fluidized bed, the third fluidized bed and the fourth fluidized bed in series (Schenk, et al., *Particuology*, 2011, 914-23). As there is no intermediary heat supplementation, the temperatures of the fluidized beds are decreased gradually from the fourth fluidized bed with a reduction temperature of about 800° C. to the first fluidized bed with a reduction temperature of only 400-500° C., at which temperature the reduction rate is so low that the first fluidized bed is mainly used for preheating.

The FINEX process is a new melting reduction process based on preheating and reduction on a fluidized bed, which was developed by Pohang Iron and Steel Co. Ltd, Korean in cooperation with Voestalpine on the basis of the COREX melting reduction technology of Voestalpine. The technical development of FINEX was started in 1992; a 15 t/d laboratory scale-up experiment was completed in 1996; a 150 t/d pilot scale test was completed in 1999; a demonstration project with an annual output of 800,000 tons began to be constructed in January 2001, reaching the target output in May 2004; and an industrialized demonstration plant with an annual output of 1500,000 tons was established in May 2007. The pre-reduction part of the FINEX process (U.S. Pat. No. 5,762,681, U.S. Pat. No. 5,785,733, CN95191907.5, CN95191873.7, US20020166412, US20060119023, US20080302212, and US20080277842), which is basically the same as that of the FIOR/FINMET process, is operated using four-stage fluidized beds in series, except that the clean coal gas obtained through purification of the coal gas generated from melting reduction (in a melting reduction furnace) is used as the reducing and fluidizing medium. The reducing gas with a gas pressure of 2.3-4.0 atm (gage pressure) passes through the fourth fluidized bed, the third fluidized bed, the second fluidized bed and the first fluidized bed in series. The unconsumed $H_2$ and CO in reduction exhaust gas are recycled after purification processes such as dust removal, decarburization, etc. The iron ore powder is reduced while passing through the first fluidized bed, the second fluidized bed, the third fluidized bed and the fourth fluidized bed in series. Like FIOR/FINMET, no separate iron ore powder preheating unit is set up in FINEX. The first fluidized bed mainly serves for drying/preheating at a temperature of about 400° C., and the fourth fluidized bed is at a temperature of 800-900° C. The fluidized bed reduction in the FINEX process has been in operation for years with an annual output of 1500,000 tons (the actual output of reduced iron ore is expected to exceed 2700,000 tons per year).

The Circofer process and Circored process are iron ore reduction processes on coal-based and gas-based fluidized beds, respectively, developed by Lurgi, Germany (Lurgi has sold its metallurgical business to Outokumpu, Finland). In the Circored process (U.S. Pat. No. 5,603,748, and Schenk et al., *Particuology*, 2011, 914-23), hydrogen is used as the reducing medium, and two-stage fluidized beds in series are employed for reduction. First, the iron ore powder is dried and preheated to 850-900° C. in a preheating unit (a combined transferring fluidized bed-cyclone-venturi preheater), and then enters into a circulating fluidized bed at a temperature of 850-900° C. for pre-reduction (first-stage reduction). The pre-reduced iron ore powder discharged from the circulating fluidized bed enters into a bubbling fluidized bed for final reduction (second-stage reduction). The bubbling fluidized bed is a horizontal transverse multi-sectional (multi-stage) fluidized bed with an operational temperature of 630-650° C. The operational pressure of both fluidized beds is 4 atm (gage pressure). The reduced iron ore powder discharged from the bubbling fluidized bed is heated by a rapid heater to a temperature above 680° C. as required for briquetting, and enters into a hot briquetting section for being briquetted. The reduction exhaust gas is recycled after treatments such as exchanging heat with circulating gas for sensible heat recycling, purification, compression, etc. Lurgi began to study the technology of iron ore reduction on circulating fluidized beds in the 1970s, primarily focused on the development of the technology with coal as the reducing medium from 1973 to 1990, and later shifted to research on the reduction technology on fluidized beds with hydrogen as the medium in 1993. In 1996, the company began to establish a demonstration project with an annual output of 500,000 tons in its plant in Trinidad, the construction of which was completed in March 1999. In May 1999, the first batch of hot briquetted iron was obtained. From 1999 to 2001, the system was debugged, optimized and restructured. In August 2001, a targeted goal of 63.6 t/h of HBI was successfully achieved. From August to November in 2001, about 130,000 tons of HBI was produced continuously. However, the system has been shut down for market reasons since November 2001. The Circofer process (US20070256519, CN100587080C, and CN100540698C) is a coal-based fluidized reduction process of iron ore developed by the Lurgi/Outokumpu company (Orth, et al., *Minerals Engineering*, 2007, 854-861). In this process, the iron ore powder exchanges heat with the exhaust gas discharged from the first fluidized bed in a combined cyclone-venturi heater. After being preheated, the iron ore powder enters into the front chamber of the first fluidized bed; meanwhile, coal powder is added and oxygen is introduced into the front chamber. The iron ore powder is preheated by the heat generated from partial combustion of the coal powder, during which reductive gas is generated at the same time. The preheated iron ore powder and the generated gas enter into the main bed of the first fluidized bed from the top of the front chamber of the first fluidized bed. The clean coal gas obtained through purification of the exhaust enters into the bottom of the first fluidized bed as the fluidizing and reducing medium. After being reduced, the iron ore powder is discharged from the lower part of the first fluidized bed into the second fluidized bed for subsequent reduction. The sponge iron obtained from the reduction process is discharged from the second fluidized bed, passes through a hot magnetic separator to remove semi coke particles contained therein, and then goes into a smelting and separating furnace for slag-iron separation. The hot exhaust gas discharged from the top of the first fluidized bed passes through the cyclone dust remover for separation, and then enters into a combined cyclone-venturi preheater to heat up the iron ore powder while cooling down the exhaust gas. After passing through a waste heat boiler for heat recycling, the gas undergoes further dust removal through a bag-type dust remover and a venture-type dust remover and $CO_2$ removal through a $CO_2$ remover to yield clean coal gas for recycling as the fluidizing and reducing medium. Lurgi established a pilot scale test platform of a circulating fluidized bed with a diameter of 700 mm and an output of 5 t/d for developing the Cirfofer technology. Until 2003, over ten rounds of tests have been conducted with a total running time of more than 70 days. However, from reports in existing documents, the Circofer technology only passed the above pilot scale test, without further reported pilot scale test or industrialized application.

In the HISmelt process, a transport bed, in combination with four-stage cyclone preheaters, preheats the iron ore powder before entering into a smelting and separating furnace (http://www.hismelt.com; Schenk et al., *Particuology*, 2011, 914-23). As it essentially does not belong to iron ore reduction technologies, and is not in close association with the present application, this technology is not detailed herein.

Except for the above fluidized-bed reduction processes which either have undergone pilot scale tests or further have been industrialized, many patents relating to the processes for reducing iron ore on fluidized beds have been filed home and aboard. In these patents, 2- to 4-stage fluidized beds are generally used for reduction, which is similar to the FIOR/FINMET and FINMET processes. Some of the processes are even essentially the same as the above two processes, whereas others differ in different combinations of stages of fluidized beds, powder preheating mode, gas preheating mode, gas operation mode, etc., thus forming a number of granted patents. It also indicates from one aspect that there is still a huge innovation space for the iron ore fluidized reduction process from the different combinations of the main aspects of stages of fluidized beds, iron powder preheating, reducing gas preheating and gas operation mode. The iron ore fluidized reduction processes home and abroad are analyzed from the above respects as follows.

1) Stages of fluidized beds: four-stage fluidized beds are used in the mainstream FIOR/FINMET and FINEX processes. Patents that employ similar four-stage fluidized beds for reduction also include: US20120328465 (2012), CN101892339 (2012), CN101397597 (2010), CN101519707 (2010), CN100560739 (2009), US20080277842 (2008), AU2001265669 (2001), etc., wherein their iron ore powder reduction parts are essentially the same as those of FIOR/FINMET and FINEX. The patents such as CN103221555 (2013), CN102127611 (2012), U.S. Pat. No. 6,960,238 (2005), U.S. Pat. No. 6,736,876 (2004), US20020166412 (2002), and U.S. Pat. No. 5,785,733 (1998) employ three-stage fluidized beds for reduction. Except for the Lurgi's process, CN201563469 (2010), CN101333575 (2010), and CN101906501 (2010) relate to two-stage fluidized beds for reduction.

2) Powder preheating: In the Lurgi's process, a combined circulating fluidized bed-cyclone preheater-venturi unit is used. In CN101906501 (2010), five-stage cyclone preheaters are used to preheat iron ore powder. In CN101333575 (2010), a slope furnace is used to preheat iron ore powder. In other patents without specific iron ore powder preheating unit, the last stage fluidized bed functions to preheat the iron ore powder, which is, in fact, essentially similar to those of the FIOR/FINMET and FINEX processes.

3) Gas preheating: a gas preheating unit is set up in the Lurgi's fluidized-bed reduction process, whereas in many patents including the patents relating to the FIOR/FINMET process (U.S. Pat. No. 5,082,251, and U.S. Pat. No. 5,192,486) and the FINEX process (U.S. Pat. No. 5,762,681, and U.S. Pat. No. 5,785,733), no preheating unit is involved or contained. However, if the gas is not preheated, the temperature of the fluidized bed cannot be maintained at 800° C. or above, which is required for the reaction. In some processes including those in patents such as CN10151970 (2010), CN101906501 (2010), AU2001265669 (2001), and U.S. Pat. No. 6,736,876 (2004), the hot gas discharged from a melting gasifier is introduced directly into the final stage fluidized bed so that the sensible heat of the hot gas from the melting gasifier can be directly utilized. However, the reducing capability of the hot gas would be weakened if the gases generated during the melting and separating process, such as $CO_2$, $H_2O$, etc., are not removed. Actually, a gas preheating unit is set up in the actual flow of FIOR/FINMET (Schenk et al., *Particuology*, 2011, 914-23), i.e., the reducing gas is preheated by a preheater before passing through the fourth stage fluidized bed, the third stage fluidized bed, the second stage fluidized bed and the first stage fluidized bed sequentially. As the reaction process absorbs heat in general, when no preheater is set up thereamong, the temperature of the fluidized bed falls gradually, reaching as low as 400-500° C. in the last stage fluidized bed (the first fluidized bed), resulting in poor reducing capabilities. To resolve this problem, U.S. Pat. No. 6,960,238 (2005) suggests that oxygen/air is introduced into hot gas before the gas enters into each fluidized bed so that the reducing gas would be directly heated up through its partially combustion. Though the temperature of the gas is elevated by direct partial combustion, the $CO_2$ and $H_2O$ generated from combustion would greatly lower the reduction potential and weaken the reducing capability of the gas, which is quite adverse to the reduction process.

4) Gas operation mode: in all existing processes, gas is operated in series and the reaction pressures vary significantly. The operating gage pressure is 11-13 atm for FIOR/FINMET; 2-4 atm. for FINEX; and 4 atm. for Circored. The operating gage pressure in CN100560739 is 4-10 atm. In some patents, such as CN101519707 (2010) and CN102127611 (2012), an operating pressure of 1-10 atm is provided. However, it is not operationally practical due to the wide range, because ten times of difference between the highest and the lowest operating pressures means the same ten times of difference between the highest and the lowest linear speeds of the fluidized beds, and generally it is hard for fluidized beds to have such operational flexibility. In many other patents, such as CN101333575 (2010), 101563469 (2010), CN103221555 (2013), and CN101892339 (2012), etc., the operating pressure is not described.

Although compared to a shaft furnace, the fluidized bed has many advantages including good contacting between the gas phase and solid phase, high heat and mass transfer efficiency, etc., the energy consumption for producing hot briquetted iron by the FIOR/FINMET process is about 15.0 GJ per ton, which is much higher than 10.5 GJ of the MIDREX process based on the shaft furnace, suggesting that the processes based on the fluidized bed still have much room for improvement in reducing energy consumption. Existing processes for reducing iron ore powder on fluidized beds still have the following two respects of problems.

High operational pressure: in both FIOR/FINMET and FINEX processes, high operating pressure is used (for example, the operating pressure in FIOR/FINMET is 12-14 atm). Since the gas compression process is energy-intensive, the gas compression consumption would be lowered greatly if the operating pressure can decrease to near atmosphere pressure (the operating pressure in MIDREX is 1-1.5 atm), and in turn the efficiency of fluidized-bed reduction of iron ore would be improved. One of the main reasons of using high-pressure operation in existing processes is that the diameter of the fluidized bed reactor can be reduced thereby. Since reducing iron ore to metallic iron by gas demands highly in thermodynamics, the iron trioxide in iron ore can be reduced to metallic iron only when the gas is excessive in a large amount. Therefore, a large amount of gas is required in the reduction process. An operation under the atmospheric pressure usually requires an oversized diameter of the fluidized bed. For example, in a 1-million-ton system using the FINMET process with an operating pressure of 12-14 atm, the diameter of the fluidized bed is still 5 m. It can be calculated that if the operation is conducted under the atmospheric pressure, the diameter of the fluidized bed will reach 17.7 m.

(2) low reduction efficiency: Although most processes use four-stage fluidized beds for reduction, no intermediary heat supplementation for the gas passing from the fourth stage to the first stage fluidized beds in series results in gradual reduction of the reaction temperature from the fourth stage to the first stage, with the temperature in the first stage fluidized bed of only 400-500° C. Since iron ore exhibits slow reduction kinetics under a temperature below 700° C., the last two stages of the conventional four-stage fluidized beds play a minor role in reduction, resulting in a low overall reduction efficiency.

In summary, lowering operating pressure of the fluidized beds and increasing the overall reduction efficiency of the multi-stage fluidized beds through process and technical innovation are the key for reducing energy consumption during iron ore reduction on fluidized beds and improving economic efficiency of the reduction process.

SUMMARY OF THE INVENTION

The present invention aims to provide a system and method for fluidized iron ore powder reduction, which can achieve highly effective reduction of iron ore powder in a fluidized bed under a near-normal pressure.

In order to achieve the above object, the present invention is implemented as follows.

The present invention provides a system for fluidized iron ore powder reduction, comprising: an iron ore powder bin 1, a screw feeder 2, an oxidizing fluidized bed 3, a primary feeder 4, a primary circulating fluidized bed 5, a secondary feeder 6, a secondary circulating fluidized bed 7, a tertiary feeder 8, a tertiary circulating fluidized bed 9, a discharger 10, a product bin 11, a burning chamber 12, a primary coal gas preheater 13, a secondary coal gas preheater 14, a tertiary coal gas preheater 15, a cyclone dust collector 16, a bag dust collector 17, an induced draft fan 18, and a chimney 19.

The oxidizing fluidized bed 3 comprises an oxidizing fluidized bed body 31, a first cyclone separator 32, a second cyclone separator 33, and a feeder 34.

The primary circulating fluidized bed 5 comprises a primary riser 51, a third cyclone separator 52, a fourth cyclone separator 53 and a primary circulating dipleg 54.

The secondary circulating fluidized bed 7 comprises a secondary riser 71, a fifth cyclone separator 72, a sixth cyclone separator 73 and a secondary circulating dipleg 74.

The tertiary circulating fluidized bed 9 comprises a tertiary riser 91, a seventh cyclone separator 92, an eighth cyclone separator 93 and a tertiary circulating dipleg 94.

A feed outlet at the bottom of the iron ore powder bin 1 is provided with a pipeline which is connected to a feed inlet of the screw feeder 2, and the iron ore powder is added to the screw feeder 2 through the pipeline. A feed outlet of the screw feeder 2 is connected to a gas outlet of the first cyclone separator 32 and an inlet of the second cyclone separator 33 through a pipeline.

The oxidizing fluidized bed body 31 is provided with a gas outlet and a feed outlet at the upper portion, a gas inlet at the bottom, and a feed inlet at the lower portion. The gas outlet of the oxidizing fluidized bed body 31 is connected to an inlet of the first cyclone separator 32, the feed inlet of the oxidizing fluidized bed body 31 is connected to a feed outlet of the feeder 34, the gas inlet of the oxidizing fluidized bed body 31 is connected to a gas outlet of the burning chamber 12 through a pipeline, and the feed outlet of the oxidizing fluidized bed body 31 is connected to a feed inlet of the primary feeder 4 through a pipeline. The inlet of the first cyclone separator 32 is also connected to a feed outlet of the second cyclone separator 33, a feed outlet of the cyclone dust collector 16, and a feed outlet of the bag dust collector 17, respectively, through a pipeline, a feed outlet of the first cyclone separator 32 is connected to a feed inlet of the feeder 34, and a gas inlet and feed outlet of the feeder 34 are connected to an air main pipe and the feed inlet of the oxidizing fluidized bed body 31, respectively, through a pipeline. An inlet of the second cyclone separator 33 is connected to the feed outlet of the screw feeder 2 and the gas outlet of the first cyclone separator through a pipeline, a gas outlet of the second cyclone separator is connected to an inlet of the cyclone dust collector 16, and the feed outlet of the second cyclone separator 33 is connected to the inlet of the first cyclone separator 32.

A gas outlet of the cyclone dust collector 16 is connected to a gas inlet of the bag dust collector 17 through a pipeline, and the feed outlet of the cyclone dust collector 16 is connected to the inlet of the first cyclone separator 32 through a pipeline. The gas inlet of the bag dust collector 17 is connected to an inlet of the induced draft fan 18, the feed outlet of the bag dust collector 17 is connected to the inlet of the first cyclone separator 32 through a pipeline, and a gas outlet of the induced draft fan 18 is connected to the chimney 19.

The primary feeder 4 is provided with a feed inlet, a gas inlet and a feed outlet. The feed inlet of the primary feeder 4 is connected to the feed outlet of the oxidizing fluidized bed body 31 through a pipeline, the gas inlet of the primary feeder 4 is connected to the coal gas main pipe, and the feed outlet of the primary feeder 4 is connected to a feed inlet of the primary riser 51 through a pipeline.

The primary riser 51 is provided with a gas outlet at the top, a gas inlet at the bottom, and a feed inlet and a circulating return port at the lower portion. The gas outlet of the primary riser 51 is connected to an inlet of the third cyclone separator 52, the feed inlet of the primary riser 51 is connected to the feed outlet of the primary feeder 4, and the gas inlet of the primary riser 51 is connected to a coal gas outlet of the primary coal gas preheater 13 through a pipeline. A gas outlet of the third cyclone separator 52 is connected to an inlet of the fourth cyclone separator 53, and a discharge port of the third cyclone separator 52 is connected to the primary circulating dipleg 54. The primary circulating dipleg 54 is provide with a return port and a discharge port at the lower portion, and the return port of the primary circulating dipleg 54 is connected to the circulating return port of the primary riser 51 through a pipeline, the discharge port of the primary circulating dipleg 54 is connected to a lower feed inlet of the secondary riser 71 through a pipeline, and a gas inlet of the primary circulating dipleg 54 is connected to the coal gas main pipe. The gas outlet of the fourth cyclone separator 53 is connected to an inlet of a reduction exhaust gas treatment system, and a discharge port of the fourth cyclone separator 53 is connected to a feed inlet of the secondary feeder 6 through a pipeline.

The secondary feeder 6 is provided with a feed inlet, a gas inlet and a feed outlet. The feed inlet of the secondary feeder 6 is connected to the discharge port of the fourth cyclone separator 53, the gas inlet of the secondary feeder 6 is connected to the coal gas main pipe, and the feed outlet of the secondary feeder 6 is connected to the an upper feed inlet of the secondary riser 71 through a pipeline.

The secondary riser 71 provided with a gas outlet at the top, an upper feed inlet at the upper portion, a gas inlet at the bottom, and the lower feed inlet and a circulating return port at the lower portion. The gas outlet of the secondary riser 71 is connected to an inlet of the fifth cyclone separator 72, the upper feed inlet of the secondary riser 71 is connected to the feed outlet of the secondary feeder 6, the lower feed inlet of the secondary riser 71 is connected to the discharge port of the primary circulating dipleg 54 through a pipeline, and the gas inlet of the secondary riser 71 is connected to a coal gas outlet of the secondary coal gas preheater 14 through a pipeline. A gas outlet of the fifth cyclone separator 72 is connected to an inlet of the sixth cyclone separator 73, and a discharge port of the fifth cyclone separator 72 is connected to the secondary circulating dipleg 74. The secondary circulating dipleg 74 is provided with a return port and a discharge port at the lower portion. The return port of the secondary circulating dipleg 74 is connected to the circulating return port of the secondary riser 71 through a pipeline, the discharge port of the secondary circulating dipleg 74 is connected to a lower feed inlet of the tertiary riser 91 through a pipeline, and the gas inlet of the secondary circulating dipleg 74 is connected to the coal gas main pipe through a pipeline. A gas outlet of the sixth cyclone separator 73 is connected to the inlet of the reduction exhaust gas treatment system, and a discharge port of the sixth cyclone separator 73 is connected to a feed inlet of the tertiary feeder 8 through a pipeline.

The tertiary feeder 8 is provided with a feed inlet, a gas inlet and a feed outlet. The feed inlet of the tertiary feeder 8 is connected to a discharge port of the sixth cyclone separator 73, the gas inlet of the tertiary feeder 8 is connected to the coal gas main pipe, and the feed outlet of the tertiary feeder 8 is connected to the an upper feed inlet of the tertiary riser 91 through a pipeline.

The tertiary riser 91 is provided with a gas outlet at the top, an upper feed inlet at the upper portion, a gas inlet at the bottom, and a lower feed inlet and a circulating return port at the lower portion. The gas outlet of the tertiary riser 91 is connected to an inlet of the seventh cyclone separator 92, the upper feed inlet of the tertiary riser 91 is connected to the feed outlet of tertiary feeder 8, the lower feed inlet of the tertiary riser 91 is connected to the discharge port of the secondary circulating dipleg 74 through a pipeline, and the gas inlet of the tertiary riser 91 is connected to a coal gas outlet of the tertiary coal gas preheater 15 through a pipeline. A gas outlet of the seventh cyclone separator 92 is connected to an inlet of the eighth cyclone separator 93, and a discharge port of the seventh cyclone separator 92 is connected to the tertiary circulating dipleg 94. The tertiary circulating dipleg 94 is provided with a return port and a discharge port at the lower portion. The return port of the tertiary circulating dipleg 94 is connected to the circulating return port of the tertiary riser 91 through a pipeline, the discharge port of the tertiary circulating dipleg 94 is connected to the product bin 11 through a pipeline, and a gas inlet of the tertiary circulating dipleg 94 is connected to the coal gas main pipe through a pipeline. A gas outlet of the eighth cyclone separator 93 is connected to the inlet of the reduction exhaust gas treatment system, and a discharge port of the eighth cyclone separator 93 is connected to a feed inlet of the discharger 10 through a pipeline.

The discharger 10 is provided with a feed inlet, a gas inlet and a feed outlet. The feed inlet of the discharger 10 is connected to the discharge port of the eighth cyclone separator 93, the gas inlet of the discharger 10 is connected to the coal gas main pipe, and the feed outlet of the discharger 10 is connected to the product bin 11 through a pipeline.

The burning chamber 12 heats the air by burning the coal gas. It is provided with a nozzle that is connected to the coal gas main pipe and the air main pipe, and a gas outlet that is connected to the gas inlet at the bottom of the oxidizing fluidized bed body 31. The gas inlet of the burning chamber 12 is connected to the air main pipe.

The coal gas preheater is divided into the primary coal gas preheater 13, the secondary coal gas preheater 14 and the tertiary coal gas preheater 15, which preheat the fluidized coal gas required for the primary circulating fluidized bed 5, the secondary circulating fluidized bed 7 and the tertiary circulating fluidized bed 9, respectively. Any one of the three primary coal gas preheaters is provided with a nozzle, a flue gas outlet, a coal gas inlet and a coal gas outlet. The nozzle is used for burning the coal gas to generate a high temperature flue gas to provide the heat required for preheating the reducing coal gas, and the nozzle is connected to the air main pipe and the coal gas main pipe through a pipeline. The flue gas outlet is connected to a flue gas main pipe, and the discharged flue gas enters into a flue gas treatment system via the flue gas main pipe for heat recovery. The coal gas inlet is connected to the coal gas main pipe, and the coal gas outlet of the primary coal gas preheater is connected to the gas inlet at the bottom of the primary riser, the coal gas outlet of the secondary coal gas preheater is connected to the gas inlet at the bottom of the secondary riser, and the coal gas outlet of the tertiary coal gas preheater is connected to the gas inlet at the bottom of the tertiary riser.

The present invention further provides a method of fluidized iron ore powder reduction based on the above system, comprising: allowing a powder and gas to enter into and pass through the above system simultaneously in the following way: the iron ore powder enters into the bubbling fluidized bed body 31 through the second cyclone separator 33, the cyclone dust collector 16, the first cyclone separator 32 and the feeder 34 from the iron ore powder bin 1 via the screw feeder 2. After being discharged from an upper feed outlet of the bubbling fluidized bed body 31, the iron ore powder enters into the primary riser 51 of the primary circulating fluidized bed 5 via the primary feeder 4; and is discharged from the outlet of the primary riser 51 into the secondary riser 71 via the third cyclone separator 52 and the primary circulating dipleg 54. The powder collected by the fourth cyclone separator 53 also enters into the secondary riser 71 via the secondary feeder 6; and is discharged from the outlet of the secondary riser 71 into the tertiary riser 91 via the fifth cyclone separator 72 and the primary circulating dipleg 74. The powder collected by the sixth cyclone separator 73 also enters into the secondary riser 91 via the tertiary feeder 8.

The reduced powder product from the tertiary circulating fluidized bed 9 is discharged into the product bin 11 via the seventh cyclone separator 92 and the primary circulating dipleg 94, and the powder product collected by the eighth cyclone separator 93 also enters into the product bin 11 via the discharger 10. After being preheated in the burning chamber 12, the air enters into the bubbling fluidized bed body 31 to contact and oxidize the iron ore powder. The coal gas and air enter into the burning chamber 12 via the nozzle for preheating the air through burning. Meanwhile, the air also enters into the bubbling fluidized bed body 31 via the gas inlet at the bottom of the feeder 34. The gas discharged from the gas outlet of the bubbling fluidized bed body 31 contacts and exchanges heat with the iron ore powder through the first cyclone separator 32 and the second cyclone separator 33, and is sent to the chimney 19 via the induced draft fan 18 for discharging after being dedusted by the cyclone dust collector 16 and the bag dust collector 17. The coal gas enters into the primary riser 51, the secondary riser 71 and the tertiary riser 91, respectively, to contact with the iron ore powder for reduction after being preheated by the primary coal gas preheater 13, the secondary coal gas preheater 14 and the tertiary coal gas preheater 15. In the meantime, the coal gas enters into the reduction system through the corresponding gas inlets at the bottom of the primary feeder 4, the primary circulating dipleg 54, the secondary feeder 6, the secondary circulating dipleg 74, the tertiary feeder 8, the tertiary circulating dipleg 94 and the discharger 10, respectively, via the pipeline. The gas discharged by the primary riser 51 is dedusted by the third cyclone separator 52 and the fourth cyclone separator 53, and then enters into the reduction exhaust gas treatment system. The gas discharged by the secondary riser 71 enters into the reduction exhaust gas treatment system via the pipeline after being dedusted by the fifth cyclone separator 72 and the sixth cyclone separator 73. The gas discharged by the tertiary riser 91 enters into the reduction exhaust gas treatment system via the pipeline after being dedusted by the seventh cyclone separator 92 and the eighth cyclone separator 93. The coal gas and air enter into the primary coal gas preheater 13, the secondary coal gas preheater 14 and the tertiary coal gas preheater 15 via the nozzle for combustion to generate heat for preheating the coal gas, and then enter into the flue gas treatment system via the pipeline.

The further improvement of the present invention lies in that the oxidization of the iron ore powder is conducted in a bubbling fluidized bed at 850-950° C.

The still further improvement of the present invention lies in that the reducing coal gas is preheated by the primary coal gas preheater 13, the secondary coal gas preheater 14, and the tertiary coal gas preheater 15 to a high temperature, which is 850-950° C.

Another improvement of the present invention lies in that the oxidized iron ore powder is reduced by three-stage circulating fluidized beds, wherein the circulating fluidized bed is operated at a high gas velocity of 5-10 m/s, and the reduction is conducted at 800-900° C.

The yet further improvement of the process of the present invention lies in that the reduction process is conducted at a low pressure, wherein the low pressure is an operating pressure of less than 1 atm.

The present invention offers the following advantages relative to the prior art:

1) The reducing gas enters into multi-stage fluidized bed reactors in a parallel mode, thereby effectively reducing the amount of reducing gas passing through an individual fluidized bed.

2) The reducing coal gas is preheated separately, such that each stage of the reducing fluidized bed can be operated at 850-950° C., thereby increasing the overall reduction efficiency of the multi-stage fluidized beds.

3) The operation at a high gas velocity significantly increases the gas throughput per cross-sectional area of the fluidized bed, while reducing the mass transfer resistance and increasing the reduction efficiency.

4) The iron ore is oxidized first, which can increase the reduction rate of the iron ore.

When the iron ore powder is reduced by the present invention, the reactor, at a pressure of less than 1 atm, can be of a size which is the same as or smaller than that of the reactor used in the conventional process under the high pressure operation, thereby overcoming the deficiency of high-power gas compression resulting from the high pressure in the traditional technology. Additionally, the present invention can increases the reduction rate of the iron ore by oxidization and decrease the diffusion resistance of the reduction process due to a high gas velocity. Moreover, the present invention has advantages such as high reducing efficiency and low energy consumption in reduction process and the like, and can improve the economy in the process of reducing the iron ore powder.

BRIEF DESCRIPTION OF THE DRAWINGS

The accompanying drawings are provided to further illustrate the present invention, and constitute a part of the specification. The drawings, together with the examples of the present invention, are used to explain the present invention, and not construed as limiting the present invention.

Reference signs: 1, iron ore powder bin; 2, screw feeder; 3, oxidizing fluidized bed; 31, fluidized bed body; 32, first cyclone separator; 33, second cyclone separator; 34, feeder; 4, primary feeder; 5, primary circulating fluidized bed; 51, primary riser; 52, third cyclone separator; 53, fourth cyclone separator; 54, primary circulating dipleg; 6, secondary feeder; 7, secondary circulating fluidized bed; 71, secondary riser; 72, fifth cyclone separator; 73, sixth cyclone separator; 74, secondary circulating dipleg; 8, tertiary feeder; 9, tertiary circulating fluidized bed; 91, tertiary riser; 92, seventh cyclone separator; 93, eighth cyclone separator; 94, tertiary circulating dipleg; 10, discharger; 11, product bin; 12, burning chamber; 13, primary coal gas preheater; 14, secondary coal gas preheater; 15, tertiary coal gas preheater; 16, cyclone dust collector; 17, bag dust collector; 18, induced draft fan; 19, chimney.

DETAILED DESCRIPTION OF THE INVENTION

In order to make the purpose, technical solutions and advantages of the present invention more apparent, a clear and complete description about the technical solutions of the examples in the present invention will be provided below with reference to the accompanying drawings of the examples of the present invention. Obviously, the examples described below are part of the examples of the present invention, rather than all of the examples. Other examples obtained by those of the ordinary skill in the art based on the examples of the present invention without creative effort also fall into the scope of protection of the present invention.

Example 1

Figure 1:
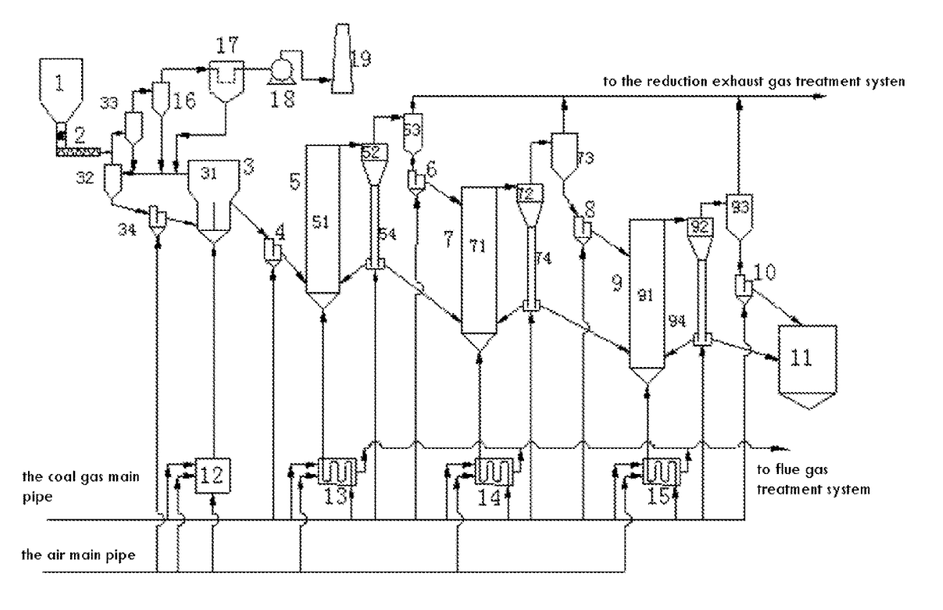
FIG. 1 is a schematic diagram illustrating the configuration of a system for fluidized iron ore powder reduction according to the present invention.

As shown in FIG. 1, a system for fluidized iron ore powder reduction comprises: an iron ore powder bin 1, a screw feeder 2, an oxidizing fluidized bed 3, a primary feeder 4, a primary circulating fluidized bed 5, a secondary feeder 6, a secondary circulating fluidized bed 7, a tertiary feeder 8, a tertiary circulating fluidized bed 9, a discharger 10, a product bin 11, a burning chamber 12, a primary coal gas preheater 13, a secondary coal gas preheater 14, and a tertiary coal gas preheater 15, a cyclone dust collector 16, a bag dust collector 17, an induced draft fan 18, and a chimney 19.

The oxidizing fluidized bed 3 comprises an oxidizing fluidized bed body 31, a first cyclone separator 32, a second cyclone separator 33, and a feeder 34.

The primary circulating fluidized bed 5 comprises a primary riser 51, a third cyclone separator 52, a fourth cyclone separator 53 and a primary circulating dipleg 54.

The secondary circulating fluidized bed 7 comprises a secondary riser 71, a fifth cyclone separator 72, a sixth cyclone separator 73 and a secondary circulating dipleg 74.

The tertiary circulating fluidized bed 9 comprises a tertiary riser 91, a seventh cyclone separator 92, an eighth cyclone separator 93 and a tertiary circulating dipleg 94.

A feed outlet at the bottom of the iron ore powder bin 1 is provided with a pipeline, which is connected to a feed inlet of the screw feeder 2, and the iron ore powder is added to the screw feeder 2 through the pipeline. A feed outlet of the screw feeder 2 is connected to a gas outlet of the first cyclone separator 32 and an inlet of the second cyclone separator 33 through a pipeline.

The oxidizing fluidized bed body 31 is provided with a gas outlet and a feed outlet at the upper portion, a gas inlet at the bottom, and a feed inlet at the lower portion. The gas outlet of the oxidizing fluidized bed body 31 is connected to an inlet of the first cyclone separator 32, the feed inlet of the oxidizing fluidized bed body 31 is connected to a feed outlet of the feeder 34, the gas inlet of the oxidizing fluidized bed body 31 is connected to a gas outlet of the burning chamber 12 through a pipeline, and the feed outlet of the oxidizing fluidized bed body 31 is connected to a feed inlet of the primary feeder 4 through a pipeline. The inlet of the first cyclone separator 32 is also connected to a feed outlet of the second cyclone separator 33, a feed outlet of the cyclone dust collector 16, and a feed outlet of the bag dust collector 17, respectively, through a pipeline, a feed outlet of the first cyclone separator 32 is connected to a feed inlet of the feeder 34, and a gas inlet and feed outlet of the feeder 34 are connected to an air main pipe and the feed inlet of the oxidizing fluidized bed body 31, respectively, through a pipeline. An inlet of the second cyclone separator 33 is connected to the feed outlet of the screw feeder 2 and the gas outlet of the first cyclone separator 32 through a pipeline, a gas outlet of the second cyclone separator 33 is connected to an inlet of the cyclone dust collector 16, and the feed outlet of the second cyclone separator 33 is connected to the inlet of the first cyclone separator 32.

A gas outlet of the cyclone dust collector 16 is connected to a gas inlet of the bag dust collector 17 through a pipeline, and the feed outlet of the cyclone dust collector 16 is connected to the inlet of the first cyclone separator 32 through a pipeline. The gas inlet of the bag dust collector 17 is connected to an inlet of the induced draft fan 18, the feed outlet of the bag dust collector is connected to the inlet of the first cyclone separator 32 through a pipeline, and a gas outlet of the induced draft fan 18 is connected to the chimney 19.

The primary feeder 4 is provided with a feed inlet, a gas inlet and a feed outlet. The feed inlet of the primary feeder 4 is connected to the feed outlet of the oxidizing fluidized bed body 31 through a pipeline. The gas inlet of the primary feeder 4 is connected to the coal gas main pipe. The feed outlet of the primary feeder 4 is connected to a feed inlet of the primary riser 51 through a pipeline.

The primary riser 51 is provided with a gas outlet at the top, a gas inlet at the bottom, and a feed inlet and a circulating return port at the lower portion. The gas outlet of the primary riser 51 is connected to an inlet of the third cyclone separator 52, the feed inlet of the primary riser 51 is connected to the feed outlet of the primary feeder 4, and the gas inlet of the primary riser 51 is connected to a coal gas outlet of the primary coal gas preheater 13 through a pipeline. A gas outlet of the third cyclone separator 52 is connected to an inlet of the fourth cyclone separator 53, and a discharge port of the third cyclone separator 52 is connected to the primary circulating dipleg 54. The primary circulating dipleg 54 is provide with a return port and a discharge port at the lower portion. The return port of the primary circulating dipleg 54 is connected to the circulating return port of the primary riser 51 through a pipeline, the discharge port of the primary circulating dipleg 54 is connected to a lower feed inlet of the secondary riser 71 through a pipeline, and a gas inlet of the primary circulating dipleg 54 is connected to the coal gas main pipe. The gas outlet of the fourth cyclone separator 53 is connected to an inlet of a reduction exhaust gas treatment system, and a discharge port of the fourth cyclone separator 53 is connected to a feed inlet of the secondary feeder 6 through a pipeline.

The secondary feeder 6 is provided with a feed inlet, a gas inlet and a feed outlet. The feed inlet of the secondary feeder 6 is connected to the discharge port of the fourth cyclone separator 53, the gas inlet of the secondary feeder 6 is connected to the coal gas main pipe, and the feed outlet of the secondary feeder 6 is connected to the an upper feed inlet of the secondary riser 71 through a pipeline.

The secondary riser 71 provided with a gas outlet at the top, an upper feed inlet at the upper portion, a gas inlet at the bottom, and the lower feed inlet and a circulating return port at the lower portion. The gas outlet of the secondary riser 71 is connected to an inlet of the fifth cyclone separator 72, the upper feed inlet of the secondary riser 71 is connected to the feed outlet of the secondary feeder 6, the lower feed inlet of the secondary riser 71 is connected to the discharge port of the primary circulating dipleg 54 through a pipeline, and the gas inlet of the secondary riser 71 is connected to a coal gas outlet of the secondary coal gas preheater 14 through a pipeline. A gas outlet of the fifth cyclone separator 72 is connected to an inlet of the sixth cyclone separator 73, and a discharge port of the fifth cyclone separator 72 is connected to the secondary circulating dipleg 74. The secondary circulating dipleg 74 is provided with a return port and a discharge port at the lower portion. The return port of the secondary circulating dipleg 74 is connected to the circulating return port of the secondary riser 71 through a pipeline, the discharge port of the secondary circulating dipleg 74 is connected to a lower feed inlet of the tertiary riser 91 through a pipeline, and the gas inlet of the secondary circulating dipleg 74 is connected to the coal gas main pipe through a pipeline. A gas outlet of the sixth cyclone separator 73 is connected to the inlet of the reduction exhaust gas treatment system, and a discharge port of the sixth cyclone separator 73 is connected to a feed inlet of the tertiary feeder 8 through a pipeline.

The tertiary feeder 8 is provided with a feed inlet, a gas inlet and a feed outlet. The feed inlet of the tertiary feeder 8 is connected to a discharge port of the sixth cyclone separator 73, the gas inlet of the tertiary feeder 8 is connected to the coal gas main pipe, and the feed outlet of the tertiary feeder 8 is connected to the an upper feed inlet of the tertiary riser 91 through a pipeline.

The tertiary riser 91 is provided with a gas outlet at the top, an upper feed inlet at the upper portion, a gas inlet at the bottom, and a lower feed inlet and a circulating return port at the lower portion. The gas outlet of the tertiary riser 91 is connected to an inlet of the seventh cyclone separator 92, the upper feed inlet of the tertiary riser 91 is connected to the feed outlet of tertiary feeder 8, the lower feed inlet of the tertiary riser 91 is connected to the discharge port of the secondary circulating dipleg 74 through a pipeline, and the gas inlet of the tertiary riser 91 is connected to a coal gas outlet of the tertiary coal gas preheater 15 through a pipeline. A gas outlet of the seventh cyclone separator 92 is connected to an inlet of the eighth cyclone separator 93, and a discharge port of the seventh cyclone separator 92 is connected to the tertiary circulating dipleg 94. The tertiary circulating dipleg 94 is provided with a return port and a discharge port at the lower portion, and the return port of the tertiary circulating dipleg 94 is connected to the circulating return port of the tertiary riser 91 through a pipeline, the discharge port of the tertiary circulating dipleg 94 is connected to the product bin 11 through a pipeline, and a gas inlet of the tertiary circulating dipleg 94 is connected to the coal gas main pipe through a pipeline. A gas outlet of the eighth cyclone separator 93 is connected to the inlet of the reduction exhaust gas treatment system, and a discharge port of the eighth cyclone separator 93 is connected to a feed inlet of the discharger 10 through a pipeline.

The discharger 10 is provided with a feed inlet, a gas inlet and a feed outlet. The feed inlet of the discharger 10 is connected to the discharge port of the eighth cyclone separator 93, the gas inlet of the discharger 10 is connected to the coal gas main pipe, and the feed outlet of the discharger 10 is connected to the product bin 11 through a pipeline.

The burning chamber 12 heats the air by burning the coal gas. It is provided with a nozzle that is connected to the gas main pipe and the air main pipe, and a gas outlet that is connected to the gas inlet at the bottom of the oxidizing fluidized bed body 31 through a pipeline. The gas inlet of the burning chamber 12 is connected to the air main pipe.

The coal gas preheater is divided into the primary coal gas preheater 13, the secondary coal gas preheater 14 and the tertiary coal gas preheater 15, which preheat the fluidized coal gas required for the primary circulating fluidized bed 5, the secondary circulating fluidized bed 7 and the tertiary circulating fluidized bed 9, respectively. Any one of the three coal gas preheaters is provided with a nozzle, a flue gas outlet, a coal gas inlet and a coal gas outlet. The nozzle is used for burning the coal gas to generate a high temperature flue gas to provide the heat for preheating the reducing coal gas, and the nozzle is connected to the air main pipe and the coal gas main pipe through a pipeline. The flue gas outlet is connected to a flue gas main pipe, and the discharged flue gas enters into a flue gas treatment system via the flue gas main pipe for heat recovery. The coal gas inlet is connected to the coal gas main pipe, the coal gas outlet of the primary coal gas preheater is connected to the gas inlet at the bottom of the primary riser, the coal gas outlet of the secondary coal gas preheater is connected to the gas inlet at the bottom of the secondary riser, and the coal gas outlet of the tertiary coal gas preheater is connected to the gas inlet at the bottom of the tertiary riser.

A bubbling fluidized bed is used as the oxidizing fluidized bed in the present example.

Example 2

A method for reducing iron ore powder by the above fluidized reduction system comprises the following steps: the iron ore powder is sent to the inlet of the second cyclone separator 33 from the iron ore powder bin 1 via the screw feeder 2. The iron ore powder separated and collected by the second cyclone separator 33 and the iron ore powder collected by the cyclone dust collector 16 and the bag dust collector 17 respectively enter into the inlet of the first cyclone separator 32 through a pipeline, and then enter into the first cyclone separator 32 for gas-solid separation after being mixed with the exhaust gas discharged by the oxidizing the fluidized bed body 31. The iron ore powder is discharged from the feed outlet at the bottom of the first cyclone separator 32 into the oxidizing fluidized bed body 31 via the feeder 34. The iron ore powder is subjected to an oxidization reaction in the oxidizing fluidized bed body 31, and then discharged from the feed outlet at the upper portion of the oxidizing fluidized bed body 31 into the primary riser 51 via the primary feeder 4. After being reduced in the primary circulating fluidized bed, it is discharged from the primary circulating dipleg 54 into the secondary riser 71 of the secondary circulating fluidized bed 7 via the lower feed inlet. Meanwhile, the iron ore powder collected by the fourth cyclone separator 53 enters into the secondary riser 71 from the upper feed inlet via the secondary feeder 6. The iron ore powder is reacted in the secondary circulating fluidized bed 7 and then discharged from the secondary circulating dipleg 74 into the tertiary riser 91 of the tertiary circulating fluidized bed 9 via the lower feed inlet. Meanwhile, the iron ore powder collected by the sixth cyclone separator 73 enters into the tertiary riser 91 from the upper feed inlet via the secondary feeder 8. The iron ore powder is reduced in the tertiary circulating fluidized bed 9 and then discharged from the tertiary circulating dipleg 94 into the product bin 11. Meanwhile, the iron ore powder collected by the eighth cyclone separator 93 enters into the product bin 11 via the discharger 10.

The coal gas, via the coal gas main pipe, is divided into three parts which enter into the primary coal gas preheater 13, the secondary coal gas preheater 14 and the tertiary coal gas preheater 15, respectively. After being preheated by the coal gas preheaters 13, 14 and 15, the coal gas is discharged from the coal gas outlet of the primary coal gas preheater 13, the secondary coal gas preheater 14 and the tertiary coal gas preheater 15 into the primary riser 51, the secondary riser 71 and the tertiary riser 91, respectively, via the gas inlet at the bottom. After a reduction reaction with the iron ore powder in the primary circulating fluidized bed 5, secondary circulating fluidized bed 7 and the tertiary circulating fluidized bed 9, it is discharged from the primary riser 51, the secondary riser 71 and the tertiary riser 91 and subjected to gas-solid separation through the third cyclone separator 52, the fifth cyclone separator 72 and the seventh cyclone separator 92. Subsequently, it is subjected to further gas-solid separation through the fourth cyclone separator 53, the sixth cyclone separator 73 and the eighth cyclone separator 93 and then enters into the reduction exhaust gas treatment system. The heat required for preheating the coal gas in the coal gas preheaters 13, 14 and 15 is obtained through combustion of the coal gas by the nozzle. The coal gas and air from the coal gas main pipe and the air main pipe are sent to the nozzles of the primary coal gas preheater 13, the secondary coal gas preheater 14 and the tertiary coal gas preheater 15, respectively, through the pipeline, and burned in the primary coal gas preheater 13, the secondary coal gas preheater 14 and the tertiary coal gas preheater 15 after being lighted by the nozzle. Then, they are discharged through the flue gas outlets of the primary coal gas preheater 13, the secondary coal gas preheater 14 and the tertiary coal gas preheater 15 into the flue gas treatment system. The air enters into the burning chamber 12 via the air main pipe. Meanwhile, the coal gas and the air enter into the nozzle of the burning chamber from the coal gas main pipe and the air main pipe, and after being lighted by the nozzle, are burned in the burning chamber 12 to provide heat for the heating air. The air is heated in the burning chamber and then enters into the oxidizing fluidized bed body 31 from the gas inlet at the bottom. After an oxidization reaction with the iron ore powder in the oxidizing fluidized bed body 31, it is dedusted by the first cyclone separator 32 and the second cyclone separator 33, and then enters into the cyclone dust collector 16 and the bag dust collector 16 for further dedusting. Finally, it is discharged through the chimney 19 via the induced draft fan 18.

Example 3

A Philippine marine placer (vanadium titano-magnetite) comprised of 63.5% $Fe_3O_4$, 2.5% $Fe_2O_3$, 22.0% $FeTiO_3$, 1.5% CaO, 3.2% MgO, 3.9% $Al_2O_3$ and 3.4% $SiO_2$ (percentages by mass) was processed according to the present invention. The iron ore powder had a particle size of 0.1-0.3 mm. After being oxidized in the oxidizing fluidized bed according to the present invention, the oxidization ratio of the Fe(II) in the vanadium titano-magnetite reached 80.5% at 850° C. for 30 min; 90.8% at 850° C. for 60 min; 85.3% at 900° C. for 20 min; and 93.6% at 950° C. for 30 min. The oxidized vanadium titano-magnetite was reduced in the three-stage circulating fluidized beds according to the above process of the present invention. When each stage of the circulating fluidized bed was operated under the conditions of a reduction temperature of 800° C., a reduction time of 30 minutes and an operating gas velocity of 5 m/s with a corresponding maximum operating pressure of 0.36 atm, the metallization ratio of the iron ore powder from the outlet of the third stage circulating fluidized bed reached 83.7%. When each stage of the circulating fluidized bed was operated under the conditions of a reduction temperature of 850° C., a reduction time of 30 minutes and an operating gas velocity of 10 m/s with a corresponding maximum operating pressure of 0.58 atm, the metallization ratio of the iron ore powder from the outlet of the third stage circulating fluidized bed reached 87.2%. When each stage of the circulating fluidized bed was operated under the conditions of a reduction temperature of 850° C., a reduction time of 60 minutes and an operating gas velocity of 9 m/s with a corresponding maximum operating pressure of 0.53 atm, the metallization ratio of the iron ore powder from the outlet of the third stage circulating fluidized bed reached 94.1%. When each stage of the circulating fluidized bed was operated under the conditions of a reduction temperature of 900° C., a reduction time of 30 minutes and an operating gas velocity of 9 m/s with a corresponding maximum operating pressure of 0.56 atm, the metallization ratio of the iron ore powder from the outlet of the third stage circulating fluidized bed reached 91.4%. In contrast, when only preheating was conducted without oxidization before the reduction, the following results were obtained for the same vanadium titano-magnetite reduced through three-stage circulating fluidized beds. When each stage was operated under the conditions of a reduction temperature of 850° C., a reduction time of 30 minutes and an operating gas velocity of 10 m/s with a corresponding maximum operating pressure of 0.59 atm, the metallization ratio of the iron ore powder from the outlet of the third stage circulating fluidized bed were only 62.9%. When each stage was operated under the conditions of a reduction temperature of 900° C., a reduction time of 30 minutes and an operating gas velocity of 9 m/s with a corresponding maximum operating pressure of 0.56 atm, the metallization ratio of the iron ore powder from the outlet of the third stage circulating fluidized bed only reached 70.2%.

Example 4

A common iron ore comprised of 82.5% $Fe_3O_4$, 3.7% CaO, 1.2% MgO, 3.8% $Al_2O_3$ and 8.8% $SiO_2$ (percentages by mass) was processed according to the present invention. The iron ore powder had a particle size of 0.15-1.0 mm. After being oxidized in the oxidizing fluidized bed according to the above process of the present invention, the oxidization ratio of the Fe(II) in the iron ore powder reached 87.3% at 850° C. for 30 min; 95.8% at 850° C. for 60 min; 90.3% at 900° C. for 20 min; and 94.9% at 950° C. for 30 min. The oxidized iron ore powder was reduced in three stage circulating fluidized beds according to the above process of the present invention. When each stage of the circulating fluidized bed was operated under the conditions of a reduction temperature of 800° C., a reduction time of 30 minutes and an operating gas velocity of 5 m/s with a corresponding maximum operating pressure of 0.35 atm, the metallization ratio of the iron ore powder from the outlet of the third stage circulating fluidized bed reached 80.7%. When each stage of the circulating fluidized bed was operated under the conditions of a reduction temperature of 850° C., a reduction time of 30 minutes and an operating gas velocity of 10 m/s with a corresponding maximum operating pressure of 0.58 atm, the metallization ratio of the iron ore powder from the outlet of the third stage circulating fluidized bed reached 86.7%. When each stage of the circulating fluidized bed was operated under the conditions of a reduction temperature of 900° C., a reduction time of 30 minutes and an operating gas velocity of 9 m/s with a corresponding maximum operating pressure of 0.55 atm, the metallization ratio of the iron ore powder from the outlet of the third stage circulating fluidized bed reached 94.8%.

Finally, it should be noted that the above examples are merely provided for illustrating the technical solutions of the present invention, rather than limiting the present invention. Although the present invention has been described in detail with reference to the above examples, those of ordinary skill in the art will appreciate that they can still modify the technical solutions described in each example above, or make equivalent replacements for some technical features therein. However, such modifications or replacements will not render the essence of corresponding technical solutions departing from the spirit and scope of the technical solutions in each example of the present invention.

What is claimed is:
1. A system for fluidized mineral powder reduction, comprising: an iron ore powder bin, a screw feeder, an oxidizing fluidized bed, a primary feeder, a primary circulating fluidized bed, a secondary feeder, a secondary circulating fluidized bed, a tertiary feeder, a tertiary circulating fluidized bed, a discharger, a product bin, a burning chamber, a primary coal gas preheater, a secondary coal gas preheater, a tertiary coal gas preheater, a cyclone dust collector, a bag dust collector, an induced draft fan, and a chimney;
wherein the oxidizing fluidized bed comprises an oxidizing fluidized bed body, a first cyclone separator, a second cyclone separator, and a feeder;
the primary circulating fluidized bed comprises a primary riser, a third cyclone separator, a fourth cyclone separator and a primary circulating dipleg;
the secondary circulating fluidized bed comprises a secondary riser, a fifth cyclone separator, a sixth cyclone separator and a secondary circulating dipleg;
the tertiary circulating fluidized bed comprises a tertiary riser, a seventh cyclone separator, an eighth cyclone separator and a tertiary circulating dipleg;
a gas outlet of the first cyclone separator is connected to an inlet of the second cyclone separator by a pipeline, a feed outlet of the iron ore powder bin is connected to a feed inlet of the screw feeder, and a feed outlet of the screw feeder is connected to the pipeline connecting the gas outlet of the first cyclone separator and the inlet of the second cyclone separator;
an inlet of the first cyclone separator is connected to a feed outlet of the second cyclone separator, a feed outlet of the cyclone dust collector, a feed outlet of the bag dust collector and a gas outlet of the oxidizing fluidized bed body through respective pipelines, a feed outlet of the first cyclone separator is connected to a feed inlet of the feeder;
a gas inlet of the feeder is connected to an air main pipe, and a feed outlet of the feeder is connected to a feed inlet of the oxidizing fluidized bed body through a pipeline;
a gas outlet of the second cyclone separator is connected to an inlet of the cyclone dust collector, a gas outlet of the cyclone dust collector is connected to a gas inlet of the bag dust collector, a gas outlet of the bag dust collector is connected to an inlet of the induced draft fan through a pipeline, and a gas outlet of the induced draft fan is connected to the chimney;
a gas inlet of the oxidizing fluidized bed body is connected to a gas outlet of the burning chamber through a pipeline, and a feed outlet of the oxidizing fluidized bed body is connected to a feed inlet of the primary feeder through a pipeline;
a gas inlet of the primary feeder is connected to a coal gas main pipe, and a feed outlet of the primary feeder is connected to a feed inlet of the primary riser through a pipeline;
a gas outlet of the primary riser is connected to an inlet of the third cyclone separator, a gas inlet of the primary riser is connected to a coal gas outlet of the primary coal gas preheater through a pipeline, and a circulating return port of the primary riser is connected to a return port of the primary circulating dipleg;
a gas outlet of the third cyclone separator is connected to an inlet of the fourth cyclone separator, and a discharge port of the third cyclone separator is connected to the primary circulating dipleg;
a discharge port of the primary circulating dipleg is connected to a lower feed inlet of the secondary riser, and a gas inlet of the primary circulating dipleg is connected to the coal gas main pipe;
a gas outlet of the fourth cyclone separator is connected to an inlet of the reduction exhaust gas treatment system, and a discharge port of the fourth cyclone separator is connected to a feed inlet of the secondary feeder through a pipeline;

a gas inlet of the secondary feeder is connected to the coal gas main pipe, and a feed outlet of the secondary feeder is connected to an upper feed inlet of the secondary riser through a pipeline;

a gas outlet of the secondary riser is connected to an inlet of the fifth cyclone separator, a gas inlet of the secondary riser is connected to a coal gas outlet of the secondary coal gas preheater through a pipeline, and a circulating return port of the secondary riser is connected to a return port of the secondary circulating dipleg;

a gas outlet of the fifth cyclone separator is connected to an inlet of the sixth cyclone separator, and a discharge port of the fifth cyclone separator is connected to the secondary circulating dipleg;

a discharge port of the secondary circulating dipleg is connected to a lower feed inlet of the tertiary riser, and a gas inlet of the secondary circulating dipleg is connected to the coal gas main pipe;

a gas outlet of the sixth cyclone separator is connected to an inlet of a reduction exhaust gas treatment system, and a discharge port of the sixth cyclone separator is connected to a feed inlet of the tertiary feeder through a pipeline;

a gas inlet of the tertiary feeder is connected to the coal gas main pipe, and a feed outlet of the tertiary feeder is connected to an upper feed inlet of the tertiary riser through a pipeline;

a gas outlet of the tertiary riser is connected to an inlet of the seventh cyclone separator, a gas inlet of the tertiary riser is connected to a coal gas outlet of the tertiary coal gas preheater through a pipeline, and a circulating return port of the tertiary riser is connected to a return port of the tertiary circulating dipleg;

a gas outlet of the seventh cyclone separator is connected to an inlet of the eighth cyclone separator, and a discharge port of the seventh cyclone separator is connected to the tertiary circulating dipleg;

a discharge port of the tertiary circulating dipleg is connected to the product bin through a pipeline, and a gas inlet of the tertiary circulating dipleg is connected to the coal gas main pipe;

a gas outlet of the eighth cyclone separator is connected to the inlet of the reduction exhaust gas treatment system, and a discharge port of the eighth cyclone separator is connected to a feed inlet of the discharger through a pipeline;

a gas inlet of the discharger is connected to the coal gas main pipe, and a feed outlet of the discharger is connected to the product bin through a pipeline;

a nozzle of the burning chamber is connected to the coal gas main pipe and air main pipe, and is capable of heating the air by burning a coal gas such that the heated air is connected to the gas inlet at the bottom of the oxidizing fluidized bed body through a pipeline;

a nozzle of any one of the primary coal gas preheater, the secondary coal gas preheater and the tertiary coal gas preheater is connected to the air main pipe and the coal gas main pipe through one or more pipelines arranged such that a high temperature flue gas is generated by burning the coal gas for preheating a reducing coal gas, a flue gas outlet of any one of the coal gas preheaters is connected to a flue gas main pipe arranged such that discharged flue gas enters into a flue gas treatment system via the flue gas main pipe for heat recovery, a coal gas inlet of any one of the coal gas preheaters is connected to the coal gas main pipe, and the coal gas outlet of any one of the coal gas preheaters is connected to the gas inlets at the bottom of the primary riser, the secondary riser and the tertiary riser, respectively.

2. The system for fluidized iron ore powder reduction according to claim 1, wherein a bubbling fluidized bed is used as the oxidizing fluidized bed.

3. A method of reduction of fluidized iron ore powder in a system according to claim 1, the method comprising: causing a powder and gas to enter into and pass through the system simultaneously in the following way: the iron ore powder enters into the bubbling fluidized bed body through the second cyclone separator, the cyclone dust collector, the first cyclone separator and the feeder from the iron ore powder bin via the screw feeder; it is discharged from an upper feed outlet of the bubbling fluidized bed body into the primary riser of the primary circulating fluidized bed via the primary feeder, and is discharged from the outlet of the primary riser into the secondary riser via the third cyclone separator and the primary circulating dipleg; a powder collected by the fourth cyclone separator also enters into the secondary riser via the secondary feeder; then, the powder is discharged from the secondary riser into the tertiary riser via the fifth cyclone separator and the primary circulating dipleg; the powder collected by the sixth cyclone separator also enters into the secondary riser via the tertiary feeder resulting in a reduced powder product; the reduced powder product from the tertiary circulating fluidized bed is discharged into the product bin via the seventh cyclone separator and the primary circulating dipleg; a powder product collected by the eighth cyclone separator also enters into the product bin via the discharger; after being preheated in the burning chamber, air enters into the bubbling fluidized bed body to contact and oxidize the iron ore powder; the coal gas and air enter into the burning chamber via nozzles resulting in preheating the air through burning; meanwhile, the air also enters into the bubbling fluidized bed body via the gas inlet at the bottom of the feeder; the gas discharged from the gas outlet of the bubbling fluidized bed body contacts and exchanges heat with the iron ore powder through the first cyclone separator and the second cyclone separator, and is sent to the chimney via the induced draft fan for discharging after being dedusted by the cyclone dust collector and the bag dust collector; the coal gas enters into the primary riser, the secondary riser and the tertiary riser, respectively, to contact with the iron ore powder for reduction after being preheated by the primary coal gas preheater, the secondary coal gas preheater and the tertiary coal gas preheater; meanwhile, the coal gas enters into the reduction system through the corresponding gas inlets at the bottom of the primary feeder, the primary circulating dipleg, the secondary feeder, the secondary circulating dipleg, the tertiary feeder, the tertiary circulating dipleg and the discharger, via respective pipelines; gas is discharged by the primary riser and dedusted by the third cyclone separator and the fourth cyclone separator, and then enters into the reduction exhaust gas treatment system through a pipeline; gas is discharged by the secondary riser and enters into the reduction exhaust gas treatment system via a pipeline after being dedusted by the fifth cyclone separator and the sixth cyclone separator; gas is discharged by the tertiary riser and enters into the reduction exhaust gas treatment system via a pipeline after being dedusted by the seventh cyclone separator and the eighth cyclone separator; the coal gas and air enter into the primary coal gas preheater, the secondary coal gas preheater and the tertiary coal gas preheater via nozzles for combustion to generate heat for preheating the coal gas, and then enter into the flue gas treatment system via the flue gas main pipe.

4. The method of reduction according to claim 3, comprising oxidizing the iron ore powder is conducted at 850-950° C.

5. The method of reduction according to claim 3, wherein the coal gas is preheated to a high temperature of 850-950° C. by the primary coal gas preheater, the secondary coal gas preheater and the tertiary coal gas preheater, respectively.

6. The method of reduction according to claim 3, wherein any one of the primary circulating fluidized bed, the secondary circulating fluidized bed and the tertiary circulating fluidized bed is operated at a high gas velocity of 5-10 m/s.

7. The method of reduction according to claim 3, wherein reduction is conducted at 800-900° C.

8. The method of reduction according to claim 3, wherein reduction is conducted at a low pressure, which is an operating pressure of less than 1 atm.

* * * * *